Oct. 24, 1944.　　　M. S. TOWSON　　　2,361,333
INDUSTRIAL TRUCK
Filed Jan. 3, 1942　　5 Sheets-Sheet 1

INVENTOR.
MORRIS S. TOWSON
BY Fay, Macklin, Golrick
Williams, Chilton and Isler
ATTORNEYS Oct. 24, 1944.  M. S. TOWSON  2,361,333
INDUSTRIAL TRUCK
Filed Jan. 3, 1942  5 Sheets-Sheet 2
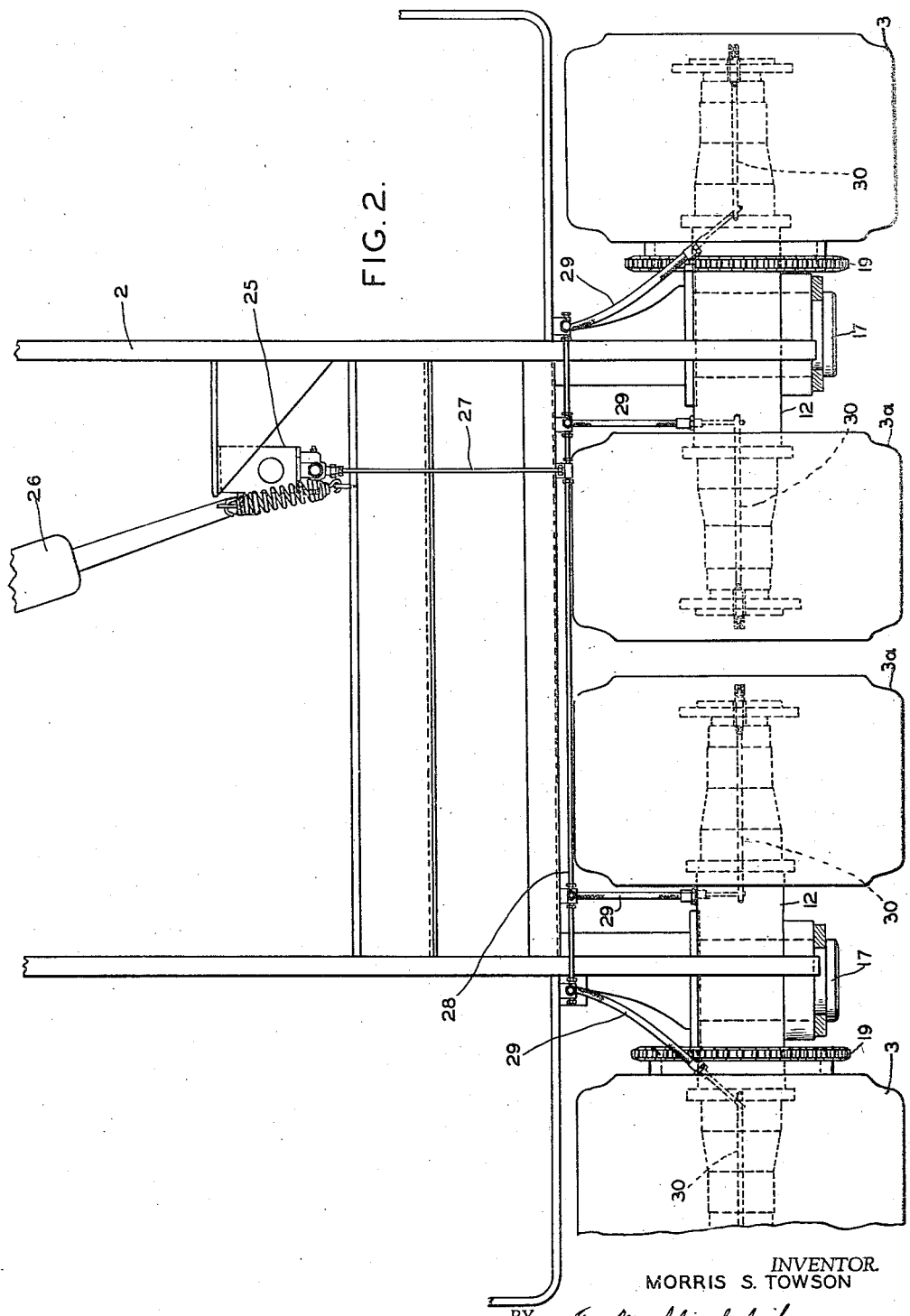
INVENTOR.
MORRIS S. TOWSON
BY
ATTORNEYS.

Oct. 24, 1944.     M. S. TOWSON     2,361,333
INDUSTRIAL TRUCK
Filed Jan. 3, 1942     5 Sheets-Sheet 3
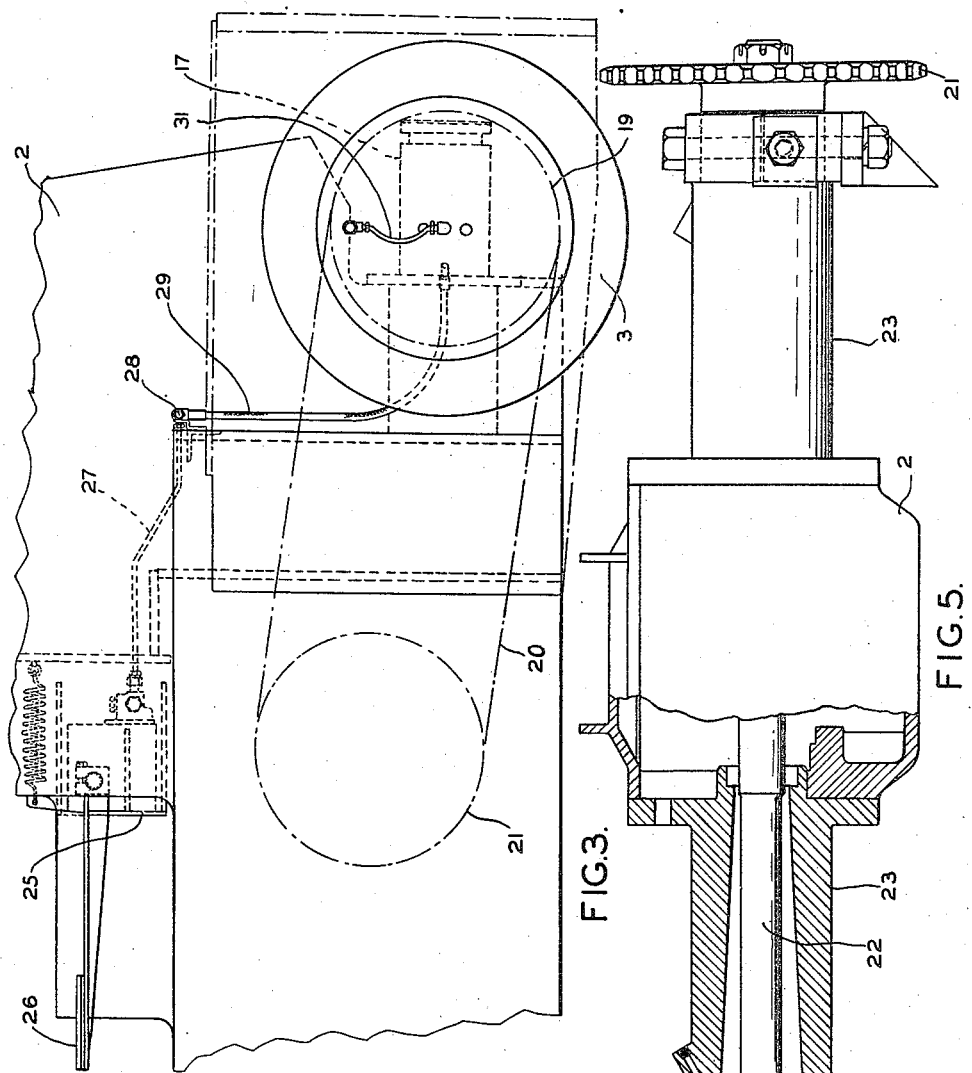
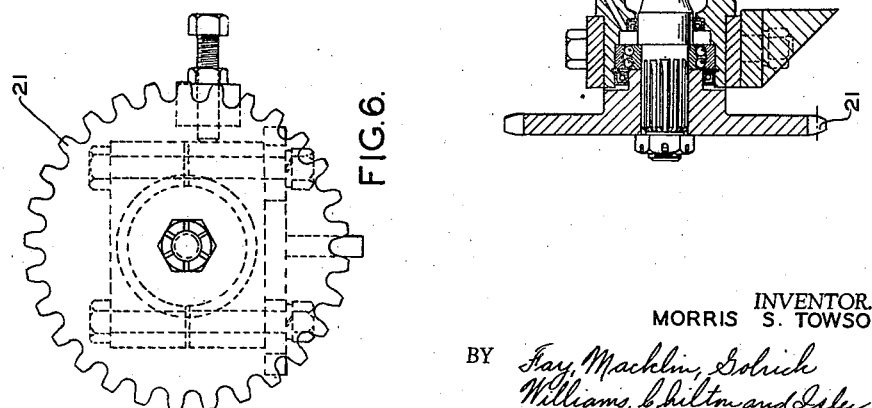
INVENTOR.
MORRIS S. TOWSON
BY Fay, Macklin, Golrick
Williams, Chilton and Isles.
ATTORNEYS.

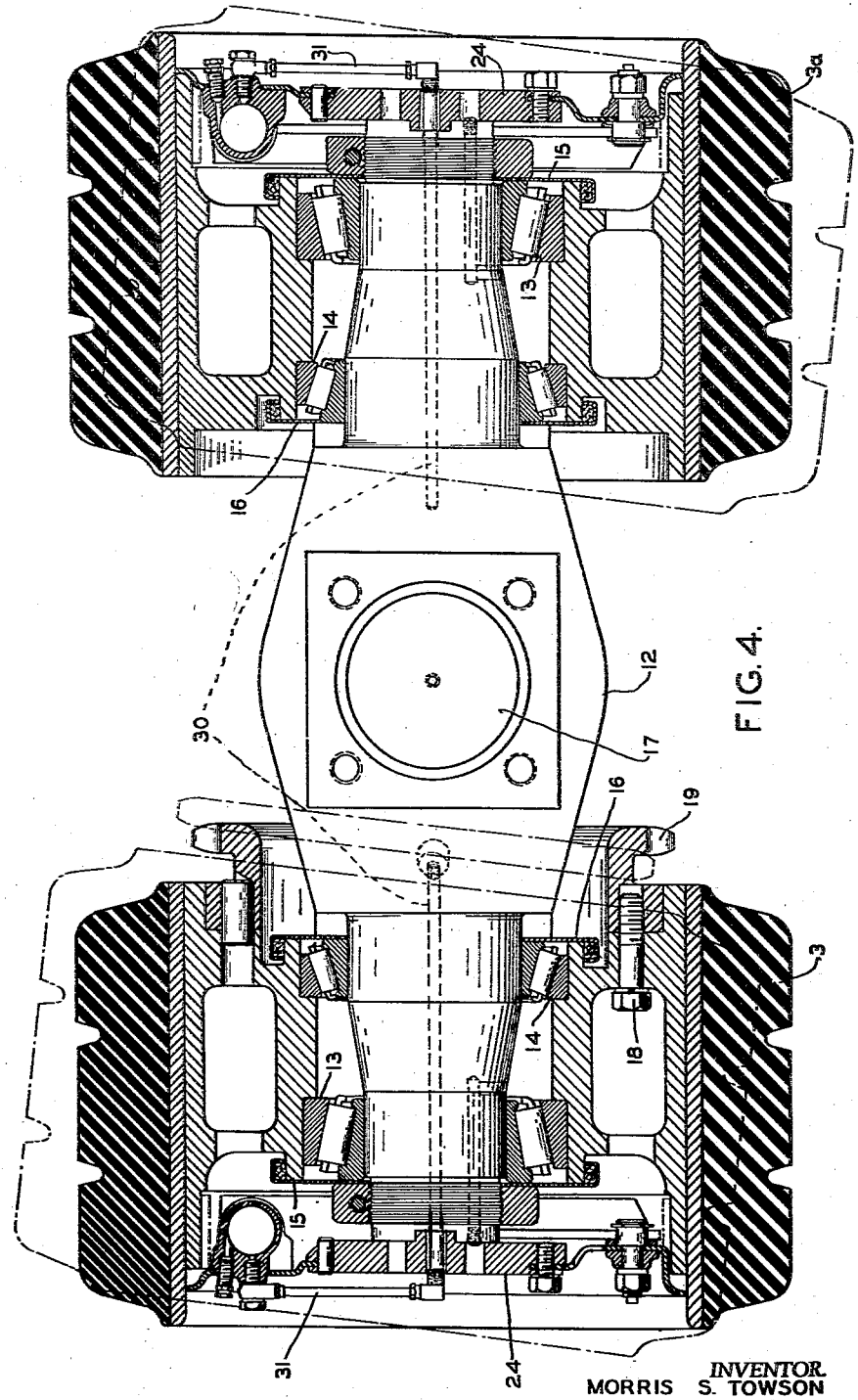

Oct. 24, 1944.  M. S. TOWSON  2,361,333
INDUSTRIAL TRUCK
Filed Jan. 3, 1942   5 Sheets-Sheet 5

INVENTOR.
MORRIS  S. TOWSON
BY
ATTORNEYS.

Patented Oct. 24, 1944

2,361,333

UNITED STATES PATENT OFFICE 2,361,333

INDUSTRIAL TRUCK

Morris S. Towson, Shaker Heights, Ohio, assignor to The Elwell-Parker Electric Company Application January 3, 1942, Serial No. 425,549

6 Claims. (Cl. 180—54)

This invention relates, as indicated, to industrial trucks, but has reference more particularly to the front wheel construction and driving and braking means in such trucks.

In Cochran Patent No. 2,242,454, there is disclosed a motor-driven industrial truck of the fork or ram type, the drive wheels of which are non-dirigible and are disposed at the sides of the uprights which comprise a slide for the load engaging carriage, and as close to the load-engaging member as is possible, the dirigible or steering wheels being located at the opposite or counterweight end of the truck.

Trucks of the aforesaid type have been continuously used in steel plants for handling coils of strip, but with the advent of strip steel of increasing widths and greater length, the weights of strip steel coils has increased to a point where it has become increasingly difficult to carry the loads on the conventionally-driven, non-dirigible wheels to which reference has been made above. The reason for this is the fact that when there is an extremely heavy load on the ram or forks, as the case may be, the opposite end of the truck is relieved of the load, and consequently, the tire pressure of the dirigible wheels adjacent the rear end of the truck against the floor is reduced to a minimum, which minimum is the minimum consistent with the necessity for maintaining reasonable stability of the truck.

In view of the foregoing, it is quite apparent that if the power plant or driving member of the truck is located adjacent the rear or counterweight end of the truck, its efficiency for driving the truck is greatly reduced at a time when its efficiency should be at a maximum, i. e., when the truck is loaded with material, with the result that the truck loses traction power, especially in slippery and oily floors, such as are encountered in steel mills. Moreover, the braking power is reduced, and, in some cases, becomes highly inefficient, so that the truck is likely to get out of control.

Another object of the invention is to provide a truck of the character described in which the supporting wheels are arranged closely adjacent the load supporting means of the truck, and are directly driven as well as braked.

A further object of the invention is to provide a truck of the character described, in which the forward supporting wheels are mounted for limited movement in a plane transverse to the normal direction of movement of the truck, whereby obstructions may be encountered by such wheels and overcome without disturbing the stability or movement of the truck.

A further object of the invention is to provide novel drive means in a truck of the character described.

A still further object of the invention is to provide a wheel of novel construction.

The present invention has, as its primary object, the provision of a truck of the aforesaid type which is capable of sustaining and transporting heavy loads of the character described in a highly efficient manner, and without substantial or costly changes in the design or construction of the truck.

Other objects and advantages of the invention will be apparent during the course of the following description.

In the accompanying drawings, forming a part of this specification, and in which like numerals are employed to designate like parts throughout the same:

Fig. 2 is a view, partly in plan, and partly in section, of the front wheel arrangement of the truck;

Fig. 3 is a fragmentary side-elevational view on an enlarged scale of the forward portion of the truck;

Fig. 4 is a cross-sectional view of one of the front wheel units taken on the line 4—4 of Fig. 1;

Fig. 5 is a view, partly in section and partly in elevation of the driveshaft for the front wheels of the truck;

Fig. 6 is an elevational view of the take-up mechanism for the drive chains of the truck;

Figure 1:
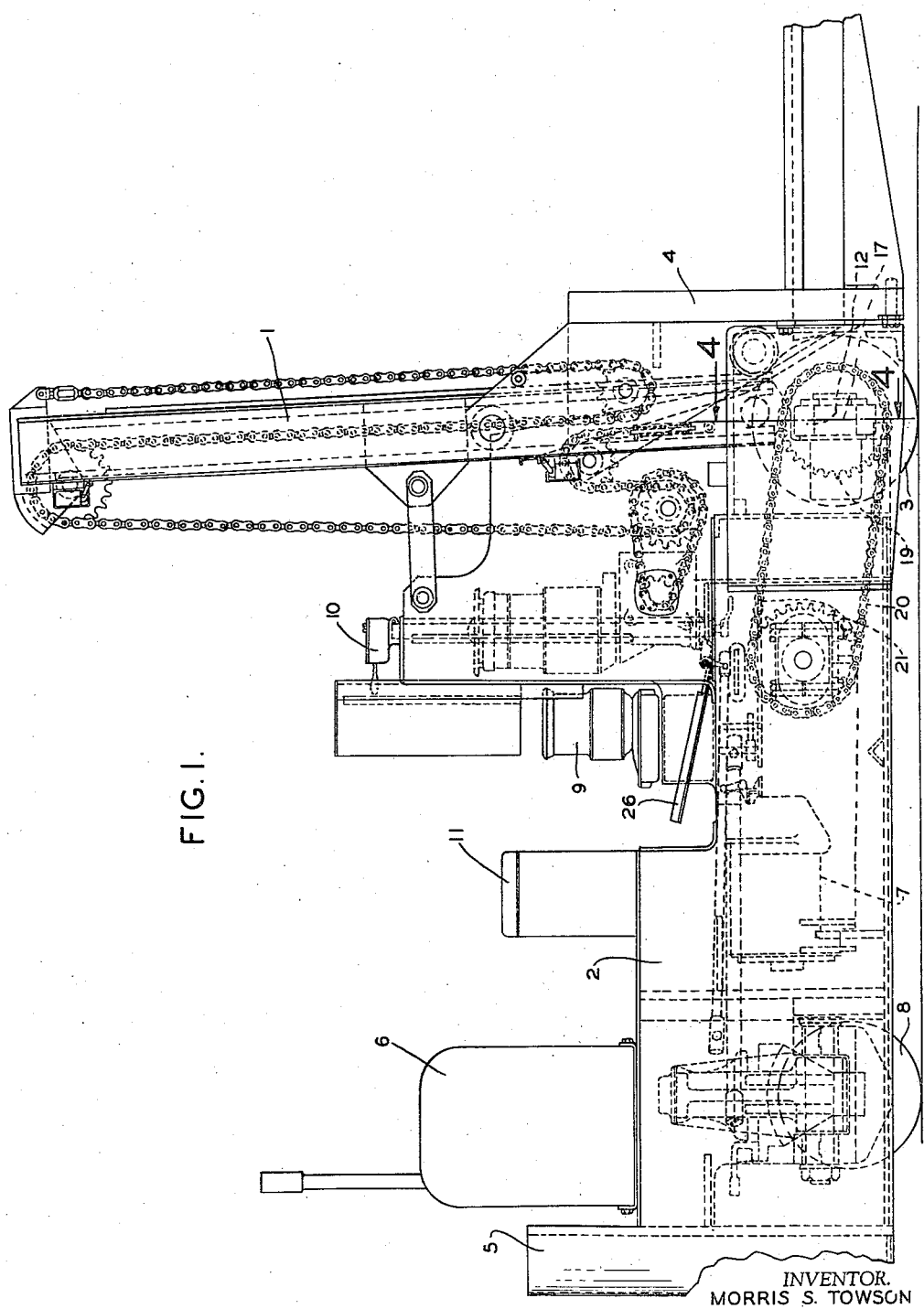
Fig. 1 is a side elevation of an industrial truck embodying the invention.

Referring more particularly to the drawings, it will be seen that the truck comprises an upright mechanism 1 mounted on one end of the truck frame 2 and adjacent pairs of forward non-dirigible wheels 3 and 3a. The uprights 1 comprise a slide for a load-engaging carriage 4, the opposite end of the truck being provided with a counterweight 5 and a source of power, within the housing 6, and which usually comprises a storage battery or other means for powering a motor 7. Immediately beneath the housing 6 are disposed dirigible or steering wheels 8, the construction and manner of mounting of which may be as described in the aforesaid Cochran patent.

The wheels 8 may be power-steered, as by means of mechanism comprising a motor 9 and controller 10, such mechanism being preferably of the type described in Cochran Patent No. 2,232,165. The truck may be further provided with a seat 11 for the operator of the truck.

The non-dirigible wheels are arranged in pairs, each pair being mounted on a wheel spindle 12, and each wheel being provided with bearing mountings 13 and 14, whereby each wheel in a pair is rotatable relatively to the other wheel. In order to prevent ingress of dirt and dust to the bearings 13 and 14, metallic sealing discs 15 and 16 are fitted to the ends of the hubs of the wheels.

Figures 7, 8:
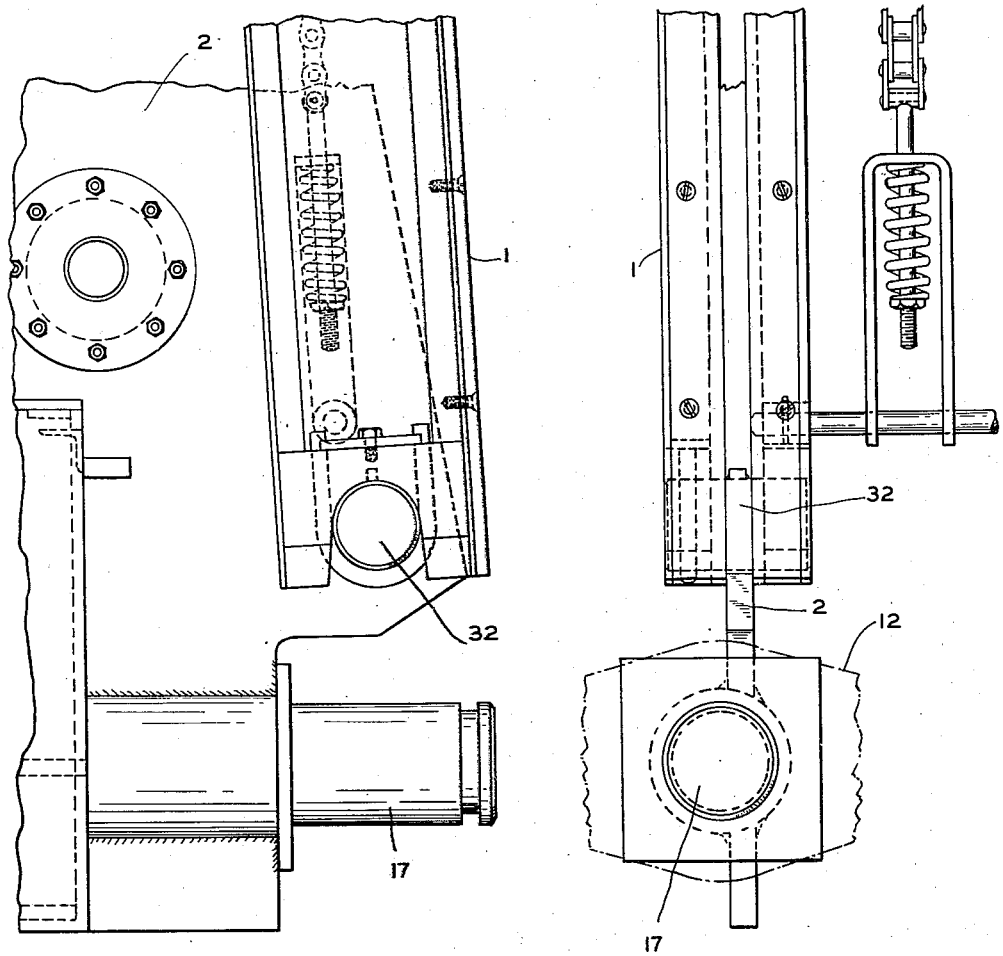
Fig. 7 is a fragmentary side elevational view, showing the manner in which the uprights are mounted on the truck frame.
Fig. 8 is a front elevational view of the parts shown in Fig. 7.

Two pairs of non-dirigible wheels are provided, the wheels being spaced apart so as to extend below the entire forward end of the truck, and each spindle 12 is mounted on a stub shaft 17, for limited pivotal movement in a vertical plane normal to the direction of movement of the truck, as indicated by the dot and dash lines in Fig. 4. The stub shafts 17 are suitably mounted on the frame of the truck as by being welded to vertical plates of the frame, as shown in Figs. 7 and 8. The aforesaid movement of the non-dirigible wheels in a vertical plane is highly desirable in that it permits one pair of wheels to overcome obstructions in the road without disturbing the stability of the other pair of wheels.

Secured, as by means of bolts 18, to the inboard sides of the outboard wheels 3 of each pair of non-dirigible wheels, are drive sprockets 19 whereby the outboard wheels may be driven by the motor 7. For this purpose the sprockets 19 are driven by endless roller sprocket chains 20, which, in turn, are driven by means of sprockets 21, which are mounted on the ends of a transversely extending shaft 22, journalled for rotation in a housing 23. The housing 23 is mounted on the frame of the truck and contains a differential driving mechanism (not shown) which is driven by the motor 7. Play in the chains 20 may be taken up by means of the take-up mechanism or adjustment shown in Fig. 6.

Each of the wheels 3 and 3a is provided with a hydraulically actuated brake, which may be of conventional construction, and the supporting structure of which is generally indicated by the reference numeral 24. The brake for the wheels 3 are disposed at the outboard sides of these wheels, while those for the wheels 3a are disposed at the inboard sides of these wheels. Fluid for the operation of these brakes is supplied from a cylinder 25, actuation of a pedal 26 causing such fluid to flow through a conduit 27, a manifold 28, flexible branch conduits 29, through conduits 30 which extend axially through the wheel spindles 12, and to pipes 31 to the brake-actuating mechanism per se.

Each of the wheels 3 and 3a is provided with a rubber tire, which, for practical considerations, should be of the maximum size available, i. e., about 14 inches wide. The weight of the load and load-engaging carriage 4 and uprights 1 is carried on pins 32, which are secured to the frame 2 of the truck at points intermediate the wheels 3 and 3a and directly above the stub shafts 17.

This arrangement permits direct driving of the wheels adjacent the load, and permits also the braking of each of the non-dirigible wheels at points adjacent the load. This is extremely advantageous since the greater the load carried by the truck, the more efficient are the driving and braking means, the pressure of the tires on the ground or floor being directly proportional to the load on the wheels.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In an industrial truck of the character described, a frame, load supporting means at the forward end of the frame and including load supporting uprights, pairs of forward wheels supporting said frame at points adjacent said uprights, and means for directly driving one wheel of each of said pairs.

2. In an industrial truck of the character described, a frame, load supporting means at the forward end of the frame and including load supporting uprights, wheels arranged in pairs below the forward end of said frame and closely adjacent said uprights, said wheels being movable in a plane transverse to the direction of movement of said truck, and means for directly driving one wheel in each pair.

3. In an industrial truck of the character described, a frame, uprights adjacent the forward end of said frame, stub shafts extending forwardly of said frame at points substantially directly below said uprights, wheel spindles mounted for pivotal movement about said stub shafts, and wheels mounted on said spindles.

4. In an industrial truck of the character described, a frame, uprights adjacent the forward end of said frame, stub shafts extending in the normal direction of movement of said truck and disposed substantially directly below said uprights, wheel spindles having intermediate portions journalled on said shafts, and wheels supported on the ends of said spindles.

5. In an Industrial truck comprising a frame and uprights disposed adjacent one end of said frame and comprising a slide for a load-supporting carriage, non-dirigible supporting wheels for the forward end of the truck disposed below said uprights in substantial vertical alignment therewith, and means for mounting said wheels to permit limited tilting movement thereof in a plane normal to the direction of movement of the truck.

6. In an industrial truck comprising a frame and uprights disposed adjacent one end of said frame and comprising a slide for a load-supporting carriage, stub shafts extending from said frame in substantial vertical alignment with said uprights, wheel spindles mounted for pivotal movement about said stub shafts, and wheels mounted on said spindles.

MORRIS S. TOWSON.